United States Patent
Steele et al.

(10) Patent No.: US 9,028,568 B2
(45) Date of Patent: May 12, 2015

(54) SYSTEM FOR TREATING CARBON DIOXIDE

(75) Inventors: Raymond Douglas Steele, Cypress, TX (US); Pradeep Stanley Thacker, Bellaire, TX (US)

(73) Assignee: General Electric Company, Schenectady, NY (US)

(*) Notice: Subject to any disclaimer, the term of this patent is extended or adjusted under 35 U.S.C. 154(b) by 1163 days.

(21) Appl. No.: 12/875,063

(22) Filed: Sep. 2, 2010

(65) Prior Publication Data

US 2012/0055088 A1 Mar. 8, 2012

(51) Int. Cl.
| | |
|---|---|
| B01J 7/00 | (2006.01) |
| C10J 3/46 | (2006.01) |
| C01B 3/24 | (2006.01) |
| C10J 3/50 | (2006.01) |
| C10J 3/72 | (2006.01) |
| C10K 1/00 | (2006.01) |

(52) U.S. Cl.
CPC ............ C10J 3/506 (2013.01); C10J 3/723 (2013.01); C10K 1/005 (2013.01); Y02E 20/18 (2013.01); C10J 2300/1603 (2013.01); C10J 2300/0959 (2013.01); C10J 2300/0969 (2013.01); C10J 2300/1618 (2013.01); C10J 2300/1815 (2013.01)

(58) Field of Classification Search
USPC ............ 48/127.9, 127.1, 61, 197 R, 76, 128, 48/198.3, 198.7
See application file for complete search history.

(56) References Cited

U.S. PATENT DOCUMENTS

| | | | | |
|---|---|---|---|---|
| 2,486,895 | A | * 11/1949 | Watson | 518/711 |
| 3,432,265 | A | * 3/1969 | Sinclair et al. | 423/352 |
| 3,871,831 | A | * 3/1975 | Andral et al. | 422/62 |
| 4,064,156 | A | * 12/1977 | McRobbie | 518/706 |
| 4,657,566 | A | * 4/1987 | Wintering et al. | 95/205 |
| 5,152,976 | A | * 10/1992 | Fong et al. | 423/652 |
| 5,319,924 | A | 6/1994 | Wallace et al. | |
| 5,345,756 | A | 9/1994 | Jahnke et al. | |
| 7,655,213 | B2 | 2/2010 | Winter et al. | |
| 7,708,801 | B2 | 5/2010 | Thacker et al. | |
| 8,268,044 | B2 | * 9/2012 | Wright et al. | 95/96 |
| 8,377,154 | B2 | * 2/2013 | Ariyapadi et al. | 48/61 |
| 2007/0129450 | A1 | * 6/2007 | Barnicki et al. | 518/704 |
| 2008/0147241 | A1 | * 6/2008 | Tsangaris et al. | 700/273 |
| 2009/0031630 | A1 | 2/2009 | Naphad et al. | |
| 2009/0092524 | A1 | * 4/2009 | Ravikumar et al. | 422/171 |
| 2009/0095155 | A1 | 4/2009 | Frydman et al. | |
| 2009/0120285 | A1 | 5/2009 | Thacker et al. | |
| 2009/0178338 | A1 | * 7/2009 | Leininger et al. | 48/86 R |
| 2009/0285738 | A1 | 11/2009 | Winter et al. | |
| 2009/0293723 | A1 | 12/2009 | Steele | |
| 2010/0077767 | A1 | * 4/2010 | Balmas et al. | 60/780 |
| 2010/0183491 | A1 | 7/2010 | Mazumdar et al. | |
| 2010/0199558 | A1 | 8/2010 | Steele | |
| 2010/0286292 | A1 | * 11/2010 | Wix | 518/702 |

* cited by examiner

Primary Examiner — Kaity Handal
(74) Attorney, Agent, or Firm — Fletcher Yoder P.C.

(57) ABSTRACT

A system includes a carbon dioxide treatment system that includes a catalyst configured to treat carbon dioxide to produce a treated carbon dioxide. The system also includes a gasifier injector configured to inject the treated carbon dioxide, a fuel, and oxygen into a gasifier. The gasifier injector may be coupled to or located inside the gasifier.

22 Claims, 5 Drawing Sheets

SYSTEM FOR TREATING CARBON DIOXIDE

BACKGROUND OF THE INVENTION

The subject matter disclosed herein relates to gas treatment systems and, more particularly, to systems for treating carbon dioxide ($CO_2$).

$CO_2$ gas may be generated because of combustion or other chemical reactions in a variety of facilities, such as refineries, petrochemical plants, or power stations. Unfortunately, the $CO_2$ gas may include various impurities, which limit use of the $CO_2$ or require special handling of the $CO_2$. For example, the impurities may be susceptible to reaction or combustion with oxygen. Thus, use of the $CO_2$ may require a dedicated line or passage for the $CO_2$, thereby increasing costs or complexities of the system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a $CO_2$ treatment system that includes a catalyst configured to treat $CO_2$ to produce a treated $CO_2$ and a gasifier injector configured to inject the treated $CO_2$, a fuel, and oxygen into a gasifier.

In a second embodiment, a system includes a $CO_2$ treatment system that includes a catalyst configured to treat $CO_2$ to produce a treated $CO_2$ and a gasifier configured to receive the treated $CO_2$, a fuel, and oxygen into a gasification chamber. The gasifier is configured to gasify the fuel to produce a syngas.

In a third embodiment, a system includes a monitor configured to monitor a composition of a catalytically treated $CO_2$ to be injected into a gasifier and a controller configured to execute a corrective control function if at least one substance in the composition of the treated $CO_2$ is not within a threshold.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
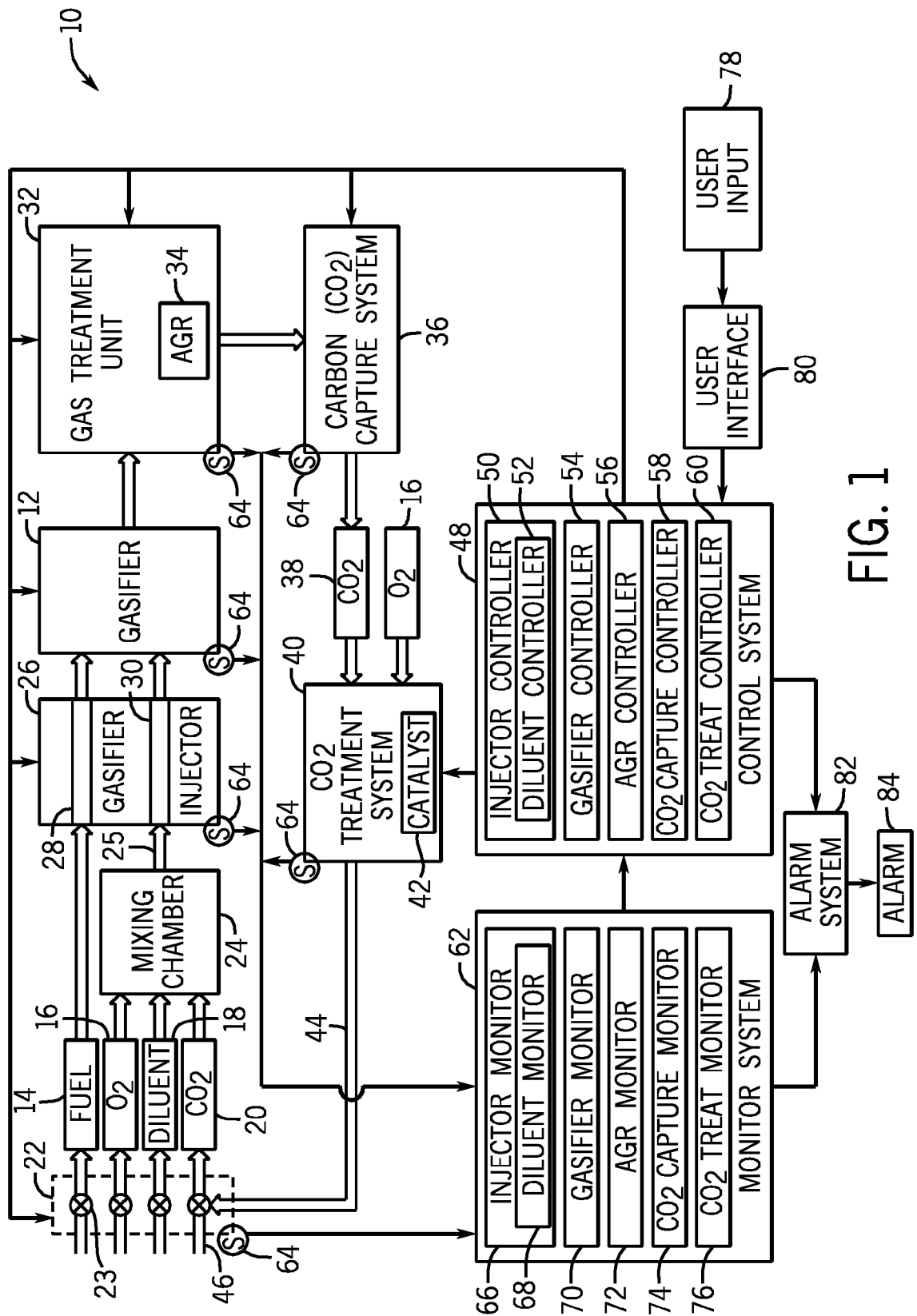
FIG. 1 is a block diagram of a $CO_2$ treatment system according to an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include systems directed toward $CO_2$ treatment systems that are configured to treat $CO_2$ to produce a treated $CO_2$, which may then be combined with oxygen as a single stream to a target application (e.g., fuel injector). The untreated $CO_2$ may include impurities (e.g., hydrogen, carbon monoxide (CO), hydrogen sulfide ($H_2S$), methane, other hydrocarbons, and so forth) that may be susceptible to reaction or combustion with oxygen. In certain embodiments, the $CO_2$ treatment system may include a catalyst to remove certain impurities from the $CO_2$ to produce the treated $CO_2$. The impurities may be adsorbed by the catalyst or converted into compounds that may not be susceptible to reaction or combustion with oxygen. Moreover, the $CO_2$ treatment system may partially remove, substantially remove, or entirely remove the impurities from the $CO_2$. The amount of impurities remaining in the treated $CO_2$ may be low enough not to be susceptible to reaction or combustion with oxygen. If the amount of impurities remaining in the treated $CO_2$ is susceptible to reaction or combustion, the effect may be insignificant. Thus, the treated $CO_2$ may be combined with oxygen. Other systems besides catalysts may also be used to remove the impurities from the $CO_2$.

In various embodiments, a gasifier injector may be configured to inject the treated $CO_2$, a fuel, and oxygen into a gasifier. Because the treated $CO_2$ contains little to no impurities that may be susceptible to reaction or combustion with oxygen, the treated $CO_2$ may be combined with the oxygen prior to being supplied to the gasifier injector. Thus, the gasifier injector does not have a separate channel for the treated $CO_2$, and a separate channel for the oxygen. Instead, the gasifier injector may have a first channel for the combined treated $CO_2$ and oxygen (e.g., a single $CO_2$/oxygen flow path) and a second channel for the fuel. In other embodiments, the gasifier injector may have one or more treated $CO_2$/oxygen channels, one or more fuel channels, and one or more oxygen channels. Reducing the number of channels in the gasifier injector may offer a number of advantages, such as simplification, reduced cost, and increased life.

In further embodiments, the $CO_2$ treatment system may be combined with a monitor and controller. The monitor may be configured to monitor a composition of the catalytically treated $CO_2$ to be injected into the gasifier. The composition may include the various impurities (e.g., hydrogen, CO, $H_2S$, methane, other hydrocarbons, and so forth) that may be present in the untreated $CO_2$. The controller may be configured to execute a corrective control function if at least one substance in the composition of the treated $CO_2$ is not within a threshold. For example, the controller may adjust the $CO_2$ treatment system to remove more impurities or the controller may reduce or divert the flow rate of the treated $CO_2$ being injected into the gasifier.

Turning now to the drawings, FIG. 1 is a block diagram of a system 10 that includes an embodiment of a $CO_2$ treatment system 40 that may produce a catalytically treated $CO_2$ for use in a partial oxidation system, such as a gasifier 12. As described in detail below, the gasifier 12 may be used to convert carbonaceous materials into CO, hydrogen, and other components. Several different feeds may be supplied to the gasifier 12, including, but not limited to, a fuel 14, oxygen 16, a diluent 18, and $CO_2$ 20. As described in detail below, the fuel 14 may include one or more carbonaceous materials. The oxygen 16 is used to react with the fuel 14. The diluent 18 may include vapors or gases, such as inert gases or non-combustible gases or vapors. Specific examples of diluents 18 include, but are not limited to, nitrogen, steam, water vapor, or combinations thereof. Further, the diluent 18 may be used to control the rate of reaction or other conditions of the gasifier 12. The $CO_2$ 20 may be used in a like manner as the diluent 18 to control conditions of the gasifier 12. In addition, the $CO_2$ 20 may participate in certain gasifier reactions, for example, but not limited to, a reverse water shift reaction, which involves the reaction of $CO_2$ with hydrogen to form CO and water. Further, the $CO_2$ 20 may be a by-product of reactions in the gasifier 12, unlike other diluents 18. Thus, the system 10 may be configured to use the $CO_2$ primarily and to use the diluent 18 when the $CO_2$ 20 is unavailable.

A feed system 22 may be used to adjust the flow rates of the fuel 14, oxygen 16, diluent 18, and $CO_2$ 20. For example, the feed system 22 may include one or more control valves 23, which may receive signals from a control system to adjust the flow rates of the various feed streams to the gasifier 12. In the illustrated embodiment, the oxygen 16, diluent 18, and $CO_2$ 20 may be combined in a mixing chamber 24 prior to being fed to the gasifier 12. In certain embodiments, the mixing chamber 24 may be used to mix the oxygen 16 with either the diluent 18 and/or the $CO_2$ 20 prior to being supplied to the gasifier 12. Thus, the output from the mixing chamber 24 is a single $CO_2$/oxygen feed 25, which may also include the diluent 18. In other embodiments, the oxygen 16 and either the diluent 18 and/or the $CO_2$ 20 may be combined upstream of the gasifier 12 to form the single $CO_2$/oxygen feed 25 without using the mixing chamber 24.

Next, the fuel 14 and the single $CO_2$/oxygen feed 25 pass through a gasifier injector 26, which may be coupled to or located inside the gasifier 12. The gasifier injector 26 may be configured to direct, combine, and/or mix the fuel 14 and the single $CO_2$/oxygen feed 25 to obtain an efficient gasification reaction when injected into the gasifier 12. Specifically, the gasifier injector 26 may include a fuel conduit 28 and a single $CO_2$/oxygen feed conduit 30, which separate the fuel 14 and the single $CO_2$/oxygen feed 25 until they are ready to be combined and reacted in the gasifier 12. Although shown as single conduits, the fuel conduit 28 and the single $CO_2$/oxygen feed conduit 30 may each include one or more conduits. Further, because the $CO_2$ 20 is combined with the oxygen 16 to form the single $CO_2$/oxygen feed 25, the gasifier injector 26 may not include a $CO_2$ conduit to separate the $CO_2$ 20 from the oxygen 16 and fuel 14. Embodiments of the gasifier injector 26 with the single $CO_2$/oxygen feed conduit 30 may be simpler, less expensive, and more reliable than other gasifier injectors with separate conduits for $CO_2$ 20. An example of an embodiment of the gasifier injector 26 is described in detail below.

The untreated syngas from the gasifier 12 is supplied to a gas treatment system 32, which removes certain components from the untreated syngas of the gasifier 12. For example, the gas treatment unit 32 may include an acid gas recovery (AGR) unit 34, which may be used to remove acid gases, such as $CO_2$ and $H_2S$, from the untreated syngas. Specifically, the AGR unit 34 may use a solvent and a distillation process to recover the acid gases from the untreated syngas. Additional processes may be used in the gas treatment unit 32 to remove other components from the untreated syngas, as discussed in detail below. The treated syngas from the gas treatment unit 32 may then be used in other processes downstream of the gasifier 12, such as combustion in a gas turbine The acid gases recovered by the gas treatment unit 32 may be supplied to a carbon capture system 36, which may be used to separate $CO_2$ from $H_2S$, for example. Thus, one of the outputs from the carbon capture system 36 may be untreated $CO_2$ 38, which may include impurities, such as, but not limited to, hydrogen, CO, $H_2S$, methane, other hydrocarbons, and so forth. The concentration of the impurities in the untreated $CO_2$ 38 may be less than approximately 1 percent, 0.75 percent, 0.5 percent, 0.25 percent, or 0.1 percent. Because such impurities may be susceptible to reaction or combustion with oxygen 16, the impurities may be removed from the untreated $CO_2$ 38 in the $CO_2$ treatment system 40. Specifically, the $CO_2$ treatment system 40 may substantially remove the impurities from the untreated $CO_2$ 38 or may convert the impurities into other compounds that can be combined with the oxygen 16 without any appreciable risk of reaction or combustion. For example, CO may be oxidized into $CO_2$, hydrogen may be oxidized into water, or $H_2S$ may be oxidized into sulfur dioxide ($SO_2$). In addition, any hydrocarbons may react with the oxygen 16 to form $CO_2$ and water.

In one embodiment, the $CO_2$ treatment system 40 may include a catalyst bed 42 to treat the untreated $CO_2$ 38. A "catalyst" is a substance that can cause a change in the rate of a chemical reaction without itself being consumed in the reaction. The catalyst bed 42 may be a catalytic oxidizer, in which the untreated $CO_2$ 38 passes over a catalyst in the presence of oxygen 16 to convert the impurities into other compounds. Specifically, the catalytic oxidizer accelerates the rate of oxidation by adsorbing the oxygen 16 and the impurities on the catalyst surface to form oxidized compounds, such as $CO_2$, water, and $SO_2$. In addition, the catalytic oxidizer may enable oxidation to occur at a substantially lower temperature than thermal oxidation, for example. The flow rate of oxygen 16 used by the catalytic oxidizer may be approximately 5 percent, 2 percent, 1 percent, 0.5 percent or 0.1 percent of the flow rate of oxygen 16 used by the gasifier 12. Examples of catalysts that may be used in the catalytic oxidizer include, but are not limited to, metal oxides, such as copper oxide, nickel oxide, manganese dioxide, and chromium oxide, and noble metals, such as platinum and palladium. In other embodiments, the $CO_2$ treatment system 40 may use other systems, such as, but not limited to, molecular sieves, fractionation, and adsorbents. For example, the $CO_2$ treatment system 40 may adsorb the impurities without converting them into other compounds. When such a $CO_2$ treatment system 40 is no longer capable of easily adsorbing the impurities, the system may be regenerated or replaced.

The output from the $CO_2$ treatment system 40 is treated $CO_2$ 44, which may still include some insubstantial amount of impurities. For example, the concentration of impurities in the treated $CO_2$ 44 may be less than approximately 500 ppm, 250 ppm, 100 ppm, or 50 ppm. Thus, the impurities may be reduced by a factor of approximately 200 times, 100 times, 50 times, 10 times or 5 times. In other words, in various embodiments, the $CO_2$ treatment system 40 may be able to remove some, substantially all, or all of the impurities from the untreated $CO_2$ 38. When impurities do remain in the treated $CO_2$ 44, such low concentrations may not be susceptible to reaction or combustion with the oxygen 16. In addition, the treated $CO_2$ 44 may include the other compounds produced by the catalytic reaction, such as, but not limited to, water and $SO_2$. Such compounds may not be susceptible to reaction or combustion with the oxygen 16. In the illustrated embodiment, the treated $CO_2$ 44 is supplied to the feed system 22 to be used as the $CO_2$ 20 for the gasifier 12. Further, fresh $CO_2$ 46 may be combined with the treated $CO_2$ 44 or fed by itself to the gasifier 12. For example, the fresh $CO_2$ 46 may be used if the flow rate of treated $CO_2$ 44 is inadequate or if the concentration of the impurities in the treated $CO_2$ 44 is not within a threshold. Alternatively or additionally, the diluent 18 may be used instead of, or in combination with, the treated $CO_2$ 44 in such situations.

A control system 48 may be used to control various equipment of the system 10 shown in FIG. 1 by outputting control signals. Examples of technologies that may be used for the control system 48 include, but are not limited to, open or closed loop control, linear or non-linear control, programmable logic controllers (PLCs), distributed controlled systems (DCS), model predictive control, statistical process control, or other methods of advanced process control. The control system 48 may be a standalone process controller or part of a larger process controller. In addition, the control system 48 may include smaller process controllers, such as an injector controller 50 to control aspects of the feed system 22 and gasifier injector 26. Specifically, the injector controller 50 may send control signals to the control valves 23 to adjust the flow rates of the feed system 22. For example, the injector controller 50 may include a diluent controller 52 to control the flow rate of the diluent 18 and/or the $CO_2$ 20. Furthermore, the injector controller 50 may control the ratios or percentages of the fuel 14, oxygen 16, diluent 18, and/or $CO_2$ 20. Similarly, the injector controller 50 may include controllers for the other feed streams.

The control system 48 may also include a gasifier controller 54 to control parameters of the gasifier 12. An example of one parameter that the gasifier controller 54 may control is a temperature within the gasifier 12. Further, the control system 48 may include an AGR unit controller 56 and a carbon capture system controller 58. The controllers 56 and 58 may be used to control various aspects or parameters of the gas treatment unit 32 and the carbon capture system 36 respectively. Examples of such parameters include, but are not limited to, temperatures, pressures, flow rates, stream compositions, or other parameters. Finally, the control system 48 may include a $CO_2$ treatment system controller 60, which may control such parameters of the $CO_2$ treatment system 40 as the flow rate of oxygen 16. In addition, the $CO_2$ treatment controller 60 may adjust the flow rate of the treated $CO_2$ 44 supplied to the gasifier 12. For example, if the concentration of at least one impurity in the treated $CO_2$ 44 is not within a threshold, the $CO_2$ treatment controller 60 may execute a corrective control function, such as reducing or diverting the flow rate of the treated $CO_2$ 44. Examples of thresholds include, but are not limited to, 450 ppm, 225 ppm, 75 ppm, or 35 ppm. Other thresholds may be based on the factor of reduction of the impurities, and may include, but are not limited to, 150 times, 125 times, 35 times, 8 times, or 2 times. Alternatively, the flow rate of the oxygen 16 to the $CO_2$ treatment system 40 may be increased, which may help return the impurity level in the treated $CO_2$ 44 to within the threshold. The control system 48 may also include other controllers to control other equipment not shown in FIG. 1.

A monitoring system 62 may send signals to the control system 48 based on parameters measured by various sensors 64 throughout the system 10. Examples of such parameters include, but are not limited to, temperatures, pressures, flow rates, stream compositions, heats of combustion or heating values, or other parameters. The monitoring system 48 may include monitors, such as an injector monitor 66 that monitors parameters of the feed system 22 and gasifier injector 26. For example, the injector monitor 66 may include a diluent monitor 68 that monitors parameters of the diluent 18 and/or the $CO_2$ 20. Next, the monitoring system 62 may include a gasifier monitor 70, which may monitor parameters of the gasifier 12. Further, the monitoring system 62 may include an AGR unit monitor 72 and a $CO_2$ capture system monitor 74. The monitors 72 and 74 may be used to monitor parameters of the gas treatment unit 32 and the carbon capture system 36 respectively. Finally, the monitoring system 62 may include a $CO_2$ treatment monitor 76, which may monitor parameters of the $CO_2$ treatment system 40, such as the composition of the treated $CO_2$ 44.

Additional input for the control system 48 may include user input 78 received through a user interface 80. Examples of user input 78 may include, but are not limited to, set points, targets, instructions, business data, maintenance conditions, and so forth. Using input from the monitoring system 62 and/or the user interface 80, the control system 48 and the various controllers of the control system 48 may use a control model or instructions stored in control software and/or a memory to output the various control signals. In addition, if at least one parameter monitored by the monitoring system 62 is outside of a predetermined range, the control system 48 may send an alarm signal to an alarm system 82 to output an alarm 84. For example, if the $CO_2$ treatment monitor 76 indicates that a level of an impurity in the treated $CO_2$ 44 is not within a threshold, the $CO_2$ treatment controller 60 may direct the alarm system 82 to generate the alarm 84. Operators may then take various actions, such as adjusting process conditions (e.g. increasing the flow rate of the oxygen 16 or increasing the flow rate of fresh $CO_2$ 46) or identifying and repairing a possible problem or malfunction. If the control system 48 has not already done so, the operators may divert the treated $CO_2$ 44 away from the gasifier 12. Further, in response to the alarm 84, the control system 8 may take automatic control actions, such as adjusting flow rates to and/or from the $CO_2$ treatment system 40 and/or the gasifier 12.

Figure 2:
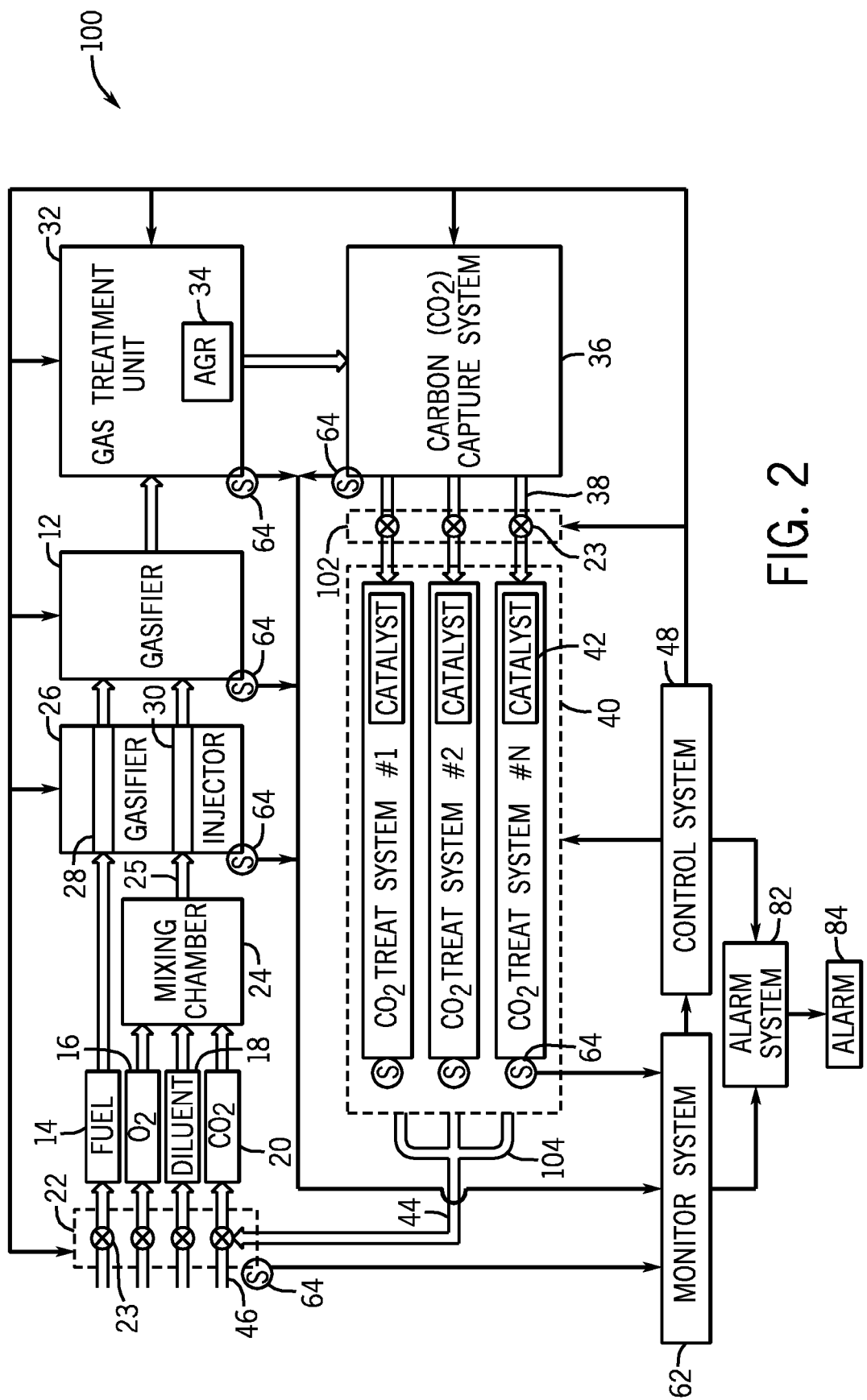
FIG. 2 is a block diagram of a $CO_2$ treatment system with one or more catalyst beds according to an embodiment.

FIG. 2 is a block diagram of a system 100 that includes an embodiment with one or more $CO_2$ treatment systems 40. Elements in common with those shown in FIG. 1 are labeled with the same reference numerals. Instead of passing directly to the $CO_2$ treatment system 40, the untreated $CO_2$ 38 from the carbon capture system 36 first passes through a $CO_2$ feed system 102, which may include one or more control valves 23. Thus, the untreated $CO_2$ 38 may be divided into one or more streams to be supplied to the one or more $CO_2$ treatment systems 40. Using more than one $CO_2$ treatment system 40 may provide certain advantages. For example, one catalyst bed 42 may be used at a time. If the concentration of an impurity in the treated $CO_2$ 44 is not within a threshold, a first control valve 23 for the first catalyst bed 42 that is in-service may close, and a second control valve 23 for a second catalyst bed 42 may open. In other words, the first catalyst bed 42 may be taken out of service and the second catalyst bed 42 put in service, or activated. The first catalyst bed 42 may then be regenerated or removed for replacement, for example. Alternatively, the first catalyst bed 42 may be used when the gasifier 12 is operating at low rates and one or more additional catalyst beds 42 may be placed in service when the gasifier 12 reaches higher rates. The catalyst beds 42 may be configured either in series or in parallel. In addition, the output from each of the catalyst beds 42 may be combined in a manifold 104 prior to being supplied to the gasifier 12. As a further example, additional catalyst beds 42 may be placed in service if the sensor 64 of the carbon capture system 36 detects higher levels of impurities in the untreated $CO_2$ 38. Other configurations of the $CO_2$ treatment system 40 using one or more catalyst beds 42 may be used depending on the particular application. In addition, the activation of additional catalyst beds 42 may be controlled by the control system 48 based on input from the monitoring system 62 and/or user input 78. Other aspects of the system 100 are similar to those of the system 10 as discussed in detail above.

Figure 3:
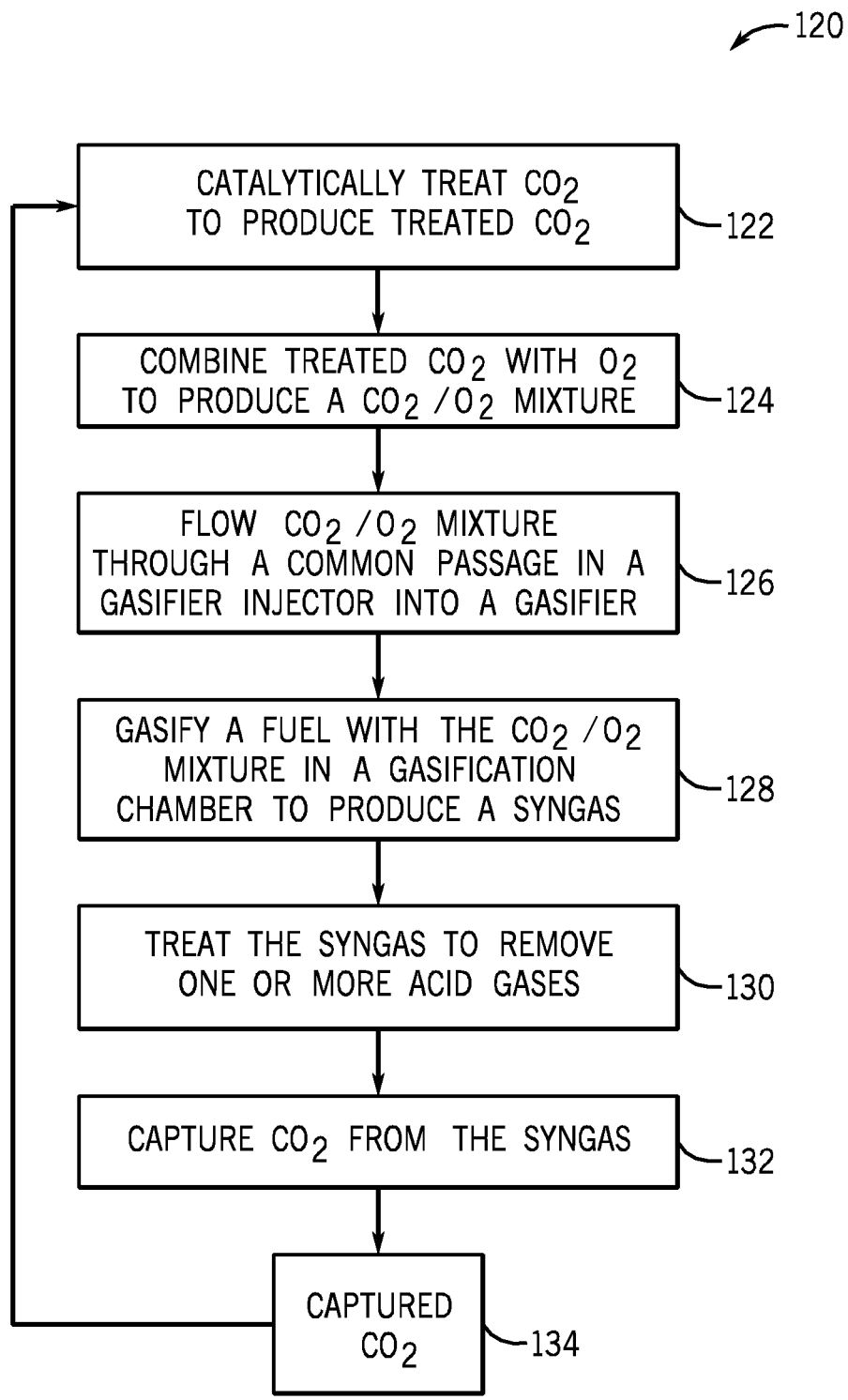
FIG. 3 is a flow chart of a process for treating $CO_2$ according to an embodiment.

FIG. 3 shows a flow chart of a process 120 that may be used to catalytically treat $CO_2$. In a step 122, untreated $CO_2$ 38 is catalytically treated to produce treated $CO_2$ 44. As described in detail above, the catalyst bed 42, or catalytic oxidizer, may be used to remove impurities present in the untreated $CO_2$ 38 or convert the impurities into compounds that are not susceptible to reaction or combustion with the oxygen 16. Thus, in a step 124, the treated $CO_2$ 44 may be combined with the oxygen 16 to produce a single $CO_2$/oxygen mixture, or feed 25. In a step 126, the single $CO_2$/oxygen mixture 25 may be flowed through a common passage, or conduit 30, in a gasifier injector 26 into a gasifier 12. Because impurities susceptible to reaction or combustion with the oxygen 16 have been substantially removed from the treated $CO_2$ 44, a common passage 30 may be used in the gasifier injector 26 instead of using separate passages for the $CO_2$ and the oxygen 16. In a step 128, the single $CO_2$/oxygen feed 25 may be combined with the fuel 14 to be gasified in a gasification chamber of the gasifier 12 to produce a syngas. In a step 130, a gas treatment unit 32 may be used to treat the syngas from the gasifier 12 by removing or recovering one or more acid gases, such as $CO_2$ or $H_2S$. The AGR unit 34 is one example of a gas treatment unit 32 that may be used to recover the acid gases from the syngas. In a step 132, $CO_2$ is captured from the syngas using, for example, the carbon capture system 36 to produce untreated $CO_2$ 38. In a step 134, the captured $CO_2$, or untreated $CO_2$ 38, from the carbon capture system 36 is supplied to the $CO_2$ treatment system 40 to be catalytically treated to produce the treated $CO_2$ 44 and the process 120 may repeat.

Figure 4:
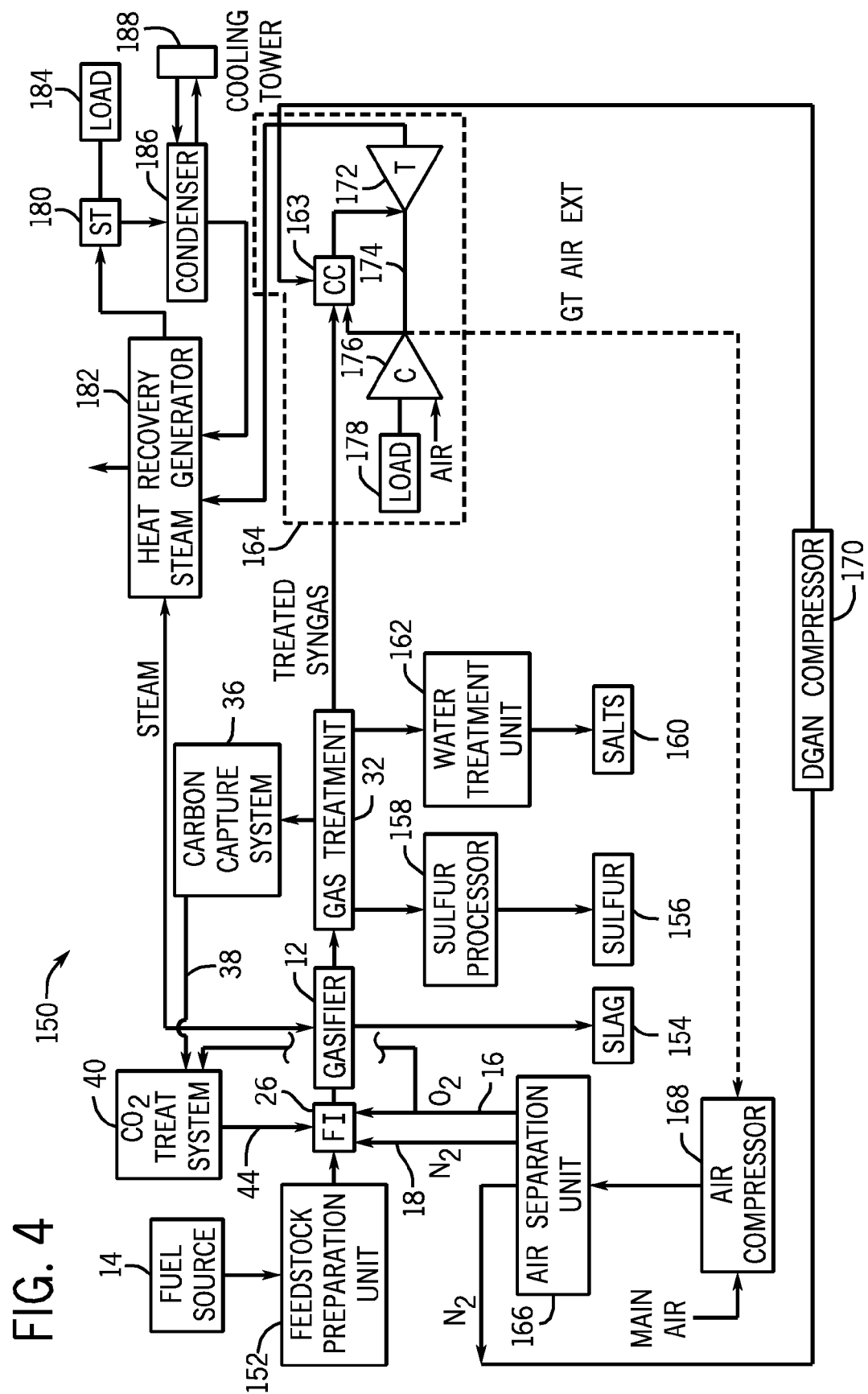
FIG. 4 is a block diagram of an IGCC power plant incorporating an embodiment of a $CO_2$ treatment system.

FIG. 4 is a diagram of an embodiment of an IGCC system 150 that produces and partially oxidizes syngas. The IGCC system 150 may include an embodiment of the $CO_2$ treatment system 40, which includes the catalyst bed 42 configured to treat $CO_2$ to produce the treated $CO_2$ 44. The IGCC system 150 may also include the gasifier injector 26 configured to inject the treated $CO_2$ 44, the fuel 14, and the oxygen 16 into the gasifier 12. The fuel 14, or fuel source, which may be a solid or a liquid, may be utilized as a feed for the IGCC system 150. The fuel source, or feed source, 14 may include coal, petroleum coke, oil, biomass, wood-based materials, agricultural wastes, tars, coke oven gas and asphalt, or other carbon containing items.

The feed source 14 may be passed to a feedstock preparation unit 152. The feedstock preparation unit 152 may, for example, resize or reshape the feed source 14 by chopping, milling, shredding, pulverizing, briquetting, or palletizing the feed source 14 to generate feedstock. Additionally, water, or other suitable liquids may be added to the feed source 14 in the feedstock preparation unit 152 to create slurry feedstock. In other embodiments, no liquid is added to the feed source 14, thus yielding dry feedstock. In further embodiments, the feedstock preparation unit 152 may be omitted if the feed source 14 is a liquid.

Next, the feedstock may be passed to the fuel injector 26 coupled to the gasifier 12. The fuel injector 26 combines the various feed streams to the gasifier 12 in such a manner as to promote efficient gasification. The gasifier 12 converts the feedstock into syngas, e.g., a combination of CO, $CO_2$, and hydrogen. This conversion may be accomplished by subjecting the feedstock to a controlled amount of water and oxygen 16 at elevated pressures, e.g., from approximately 2000 kilopascals to 8500 kilopascals, and temperatures, e.g., approximately 700 degrees C. to 1600 degrees C., depending on the type of gasifier 12 utilized. The gasification process may generate a solid (e.g., char) and gases (e.g., CO, $CO_2$, hydrogen, water, and nitrogen).

In addition, the treated $CO_2$ 44 from the $CO_2$ treatment system 40 may be flowed to the fuel injector 26, as described in detail above. Although shown flowing to the fuel injector 26 separately from the oxygen 16 in FIG. 4 for sake of simplicity, in various embodiments, the treated $CO_2$ 44 and the oxygen 16 are combined prior to the fuel injector 26 as described in detail above. In certain embodiments, the $CO_2$ treatment system 40 may include a catalytic oxidizer, in which untreated $CO_2$ 38 from the carbon capture system 36 is combined with oxygen 16 to produce the treated $CO_2$ 44. The treated $CO_2$ 44 may be used, for example, to help control the temperature of the gasifier 12, to participate in the reverse water shift reaction to produce CO, or in other chemical reactions.

In this way, the gasifier 12 generates a synthesis gas. This synthesis gas may be composed of approximately 85% of CO and hydrogen in various proportions, as well as $CH_4$, HCl, HF, COS, $NH_3$, HCN, and $H_2S$ (based on the sulfur content of the feedstock). This resultant gas may be termed untreated syngas, because it includes, for example, $H_2S$. The gasifier 12 may also generate waste, such as slag 154, which may be a wet ash material. This slag 154 may be removed from the gasifier 12 and sent to disposal or various uses. The gas treatment unit 32 may be utilized to clean the untreated syngas. In one embodiment, the gas treatment unit 32 may include a water gas shift reactor. The gas treatment unit 32 may scrub the untreated syngas to remove the HCl, HF, COS, HCN, and $H_2S$ from the untreated syngas, which may include separation of sulfur 156 in a sulfur processor 158. Furthermore, the gas treatment unit 32 may separate salts 160 from the untreated syngas via a water treatment unit 162 that may utilize water purification techniques to generate usable salts 160 from the untreated syngas. Subsequently, the gas from the gas treatment unit 32 may include treated syngas (e.g., the sulfur 156 has been removed from the syngas), with trace amounts of other chemicals, e.g., $NH_3$ (ammonia) and $CH_4$ (methane).

In some embodiments, a gas processor may be utilized to remove additional residual gas components, such as ammonia and methane, as well as methanol or any residual chemicals from the treated syngas. However, removal of residual gas components from the treated syngas is optional, because the treated syngas may be utilized as a fuel even when it includes the residual gas components, e.g., tail gas. At this point, the treated syngas is substantially stripped of $H_2S$.

In some embodiments, the carbon capture system 36 may remove and process the carbonaceous gas (e.g., carbon dioxide) included in the syngas. The carbon capture system 36 also may include a compressor, a purifier, a pipeline that supplies $CO_2$ for sequestration, enhanced oil recovery, or other uses, a $CO_2$ storage tank, or any combination thereof. As described in detail above, the untreated $CO_2$ 38 from the carbon capture system 36 may include impurities, such as, but not limited to, hydrogen, CO, $H_2S$, methane, other hydrocarbons, and so forth. Thus, the $CO_2$ treatment system 40 may be used to remove such impurities before the $CO_2$ is supplied to the gasifier 12. The treated syngas, which has undergone the removal of its sulfur containing components and a large fraction of its $CO_2$, may be then transmitted to a combustor 163, e.g., a combustion chamber, of a gas turbine engine 164 as combustible fuel.

The IGCC system 150 may further include an air separation unit (ASU) 166. The ASU 166 may operate to separate air into component gases by, for example, distillation techniques. The ASU 166 may separate oxygen from the air supplied to it from an air compressor 168, and the ASU 166 may transfer the separated oxygen 16 to the fuel injector 26. Additionally, the ASU 166 may transmit separated nitrogen 18 to the fuel injector 26, to be used as the diluent 18, or to a diluent nitrogen (DGAN) compressor 170.

The DGAN compressor 170 may compress the nitrogen 18 received from the ASU 166 at least to pressure levels equal to those in the combustor 163, so as not to interfere with the proper combustion of the syngas. Thus, once the DGAN compressor 170 has adequately compressed the nitrogen 18 to a proper level, the DGAN compressor 170 may transmit the compressed nitrogen to the combustor 163 of the gas turbine engine 164. The nitrogen may be used as a diluent to control the temperature of the combustion turbine.

As described previously, the compressed nitrogen may be transmitted from the DGAN compressor 170 to the combustor 163 of the gas turbine engine 164. The gas turbine engine 164 may include a turbine 172, a drive shaft 174, and a compressor 176, as well as the combustor 163. The combustor 163 may receive fuel, such as syngas, which may be injected under pressure from fuel nozzles. This fuel may be mixed with compressed air as well as compressed nitrogen from the DGAN compressor 170, and combusted within combustor 163. This combustion may create hot pressurized exhaust gases.

The combustor 163 may direct the exhaust gases towards an exhaust outlet of the turbine 172. As the exhaust gases from the combustor 163 pass through the turbine 172, the exhaust gases force turbine blades in the turbine 172 to rotate the drive shaft 174 along an axis of the gas turbine engine 164. As illustrated, the drive shaft 174 is connected to various components of the gas turbine engine 164, including the compressor 176.

The drive shaft 174 may connect the turbine 172 to the compressor 176 to form a rotor. The compressor 176 may include blades coupled to the drive shaft 174. Thus, rotation of turbine blades in the turbine 172 may cause the drive shaft 174 connecting the turbine 172 to the compressor 176 to rotate blades within the compressor 176. This rotation of blades in the compressor 176 causes the compressor 176 to compress air received via an air intake in the compressor 176. The compressed air may then be fed to the combustor 163 and mixed with fuel and compressed nitrogen to allow for higher efficiency combustion. The drive shaft 174 may also be connected to a load 178, which may be a stationary load, such as an electrical generator for producing electrical power, for example, in a power plant. Indeed, load 178 may be any suitable device that is powered by the rotational output of the gas turbine engine 164.

The IGCC system 150 also may include a steam turbine engine 180 and a heat recovery steam generation (HRSG) system 182. The steam turbine engine 180 may drive a second load 184. The second load 184 may also be an electrical generator for generating electrical power. However, both the first 178 and second 184 loads may be other types of loads capable of being driven by the gas turbine engine 164 and steam turbine engine 180. In addition, although the gas turbine engine 164 and steam turbine engine 180 may drive separate loads 178 and 184, as shown in the illustrated embodiment, the gas turbine engine 164 and steam turbine engine 180 may also be utilized in tandem to drive a single load via a single shaft. The specific configuration of the steam turbine engine 180, as well as the gas turbine engine 164, may be implementation-specific and may include any combination of sections.

The system 150 may also include the HRSG 182. Heated exhaust gas from the gas turbine engine 164 may be transported into the HRSG 182 and used to heat water and produce steam used to power the steam turbine engine 180. Exhaust from, for example, a low-pressure section of the steam turbine engine 180 may be directed into a condenser 186. The condenser 186 may utilize a cooling tower 188 to exchange heated water for chilled water. The cooling tower 188 acts to provide cool water to the condenser 186 to aid in condensing the steam transmitted to the condenser 186 from the steam turbine engine 180. Condensate from the condenser 186 may, in turn, be directed into the HRSG 182. Again, exhaust from the gas turbine engine 164 may also be directed into the HRSG 182 to heat the water from the condenser 186 and produce steam.

In combined cycle systems, such as the IGCC system 150, hot exhaust may flow from the gas turbine engine 164 and pass to the HRSG 182, where it may be used to generate high-pressure, high-temperature steam. The steam produced by the HRSG 182 may then be passed through the steam turbine engine 180 for power generation. In addition, the produced steam may also be supplied to any other processes where steam may be used, such as to the gasifier 12. The gas turbine engine 164 generation cycle is often referred to as the "topping cycle," whereas the steam turbine engine 180 generation cycle is often referred to as the "bottoming cycle." By combining these two cycles as illustrated in FIG. 4, the IGCC system 150 may lead to greater efficiencies in both cycles. In particular, exhaust heat from the topping cycle may be captured and used to generate steam for use in the bottoming cycle.

Figure 5:
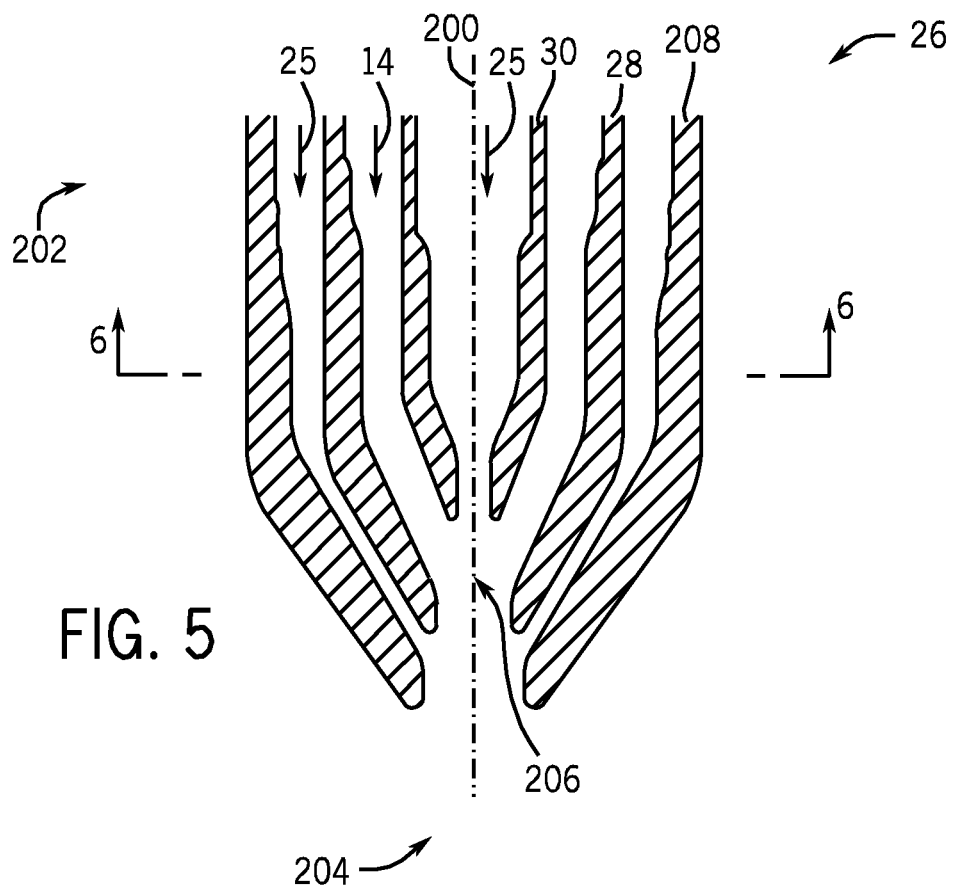
FIG. 5 is an axial cross-section of a fuel injector that may be used with an embodiment of a $CO_2$ treatment system.

Turning next to the fuel injector 26 in more detail, FIG. 5 is an axial cross-section of the fuel injector 26 in accordance with an embodiment of the $CO_2$ treatment system 40. An axial axis 200 passes through the center of the fuel injector 26. The fuel injector 26 has an upstream side 202, from which the fuel 14, oxygen 16, and $CO_2$ 20 may originate. The fuel injector 26 also has a tip 204, where the fuel 14, oxygen 16, and $CO_2$ 20 may exit. Thus, the tip 204 is an outlet for the materials. Turning next to the conduits of the fuel injector 26, although one arrangement of conduits will be described, other arrangements are possible depending on the requirements of a particular application. Specifically, the innermost material passing through the fuel injector 26 is the single $CO_2$/oxygen feed 25, which is directed to the tip 204 by a first single $CO_2$/oxygen feed conduit 30. The first single $CO_2$/oxygen feed conduit 30 simultaneously supplies oxygen 16 for partial oxidation and treated $CO_2$ 44 for gasifier 12 temperature control or for the reverse water shift reaction.

The next outermost material is the fuel 14, which is directed to the tip 204 by the fuel conduit 28. Thus, the fuel conduit 28 surrounds the first single $CO_2$/oxygen feed conduit 30 in a coaxial or concentric arrangement. The fuel 14 may include a dry fuel, a slurry fuel, a liquid fuel, or any combination thereof. The fuel conduit 28 directs the fuel 14 just downstream of the single $CO_2$/oxygen feed 25 from the first single $CO_2$/oxygen feed conduit 30 to enhance the mixing of the fuel 14 and the single $CO_2$/oxygen feed 25. The region where the single $CO_2$/oxygen feed 25 from the first single $CO_2$/oxygen feed conduit 30 and the fuel 14 combine may be referred to as a pre-mix zone 206. The next outermost material is the single $CO_2$/oxygen feed 25, which is directed to the tip 204 of the fuel injector 26 by a second single $CO_2$/oxygen feed conduit 208. Thus, the second single $CO_2$/oxygen feed conduit 208 surrounds the fuel conduit 28 in a coaxial or concentric arrangement. The second single $CO_2$/oxygen feed conduit 208 may direct the single $CO_2$/oxygen feed 25 to the mixture of the fuel 14 and the single $CO_2$/oxygen feed 25 from the first single $CO_2$/oxygen feed conduit 30 to produce a fine spray for efficient partial oxidation. As described in detail above, the single $CO_2$/oxygen feed 25 may also include diluent 18, such as nitrogen.

Figure 6:
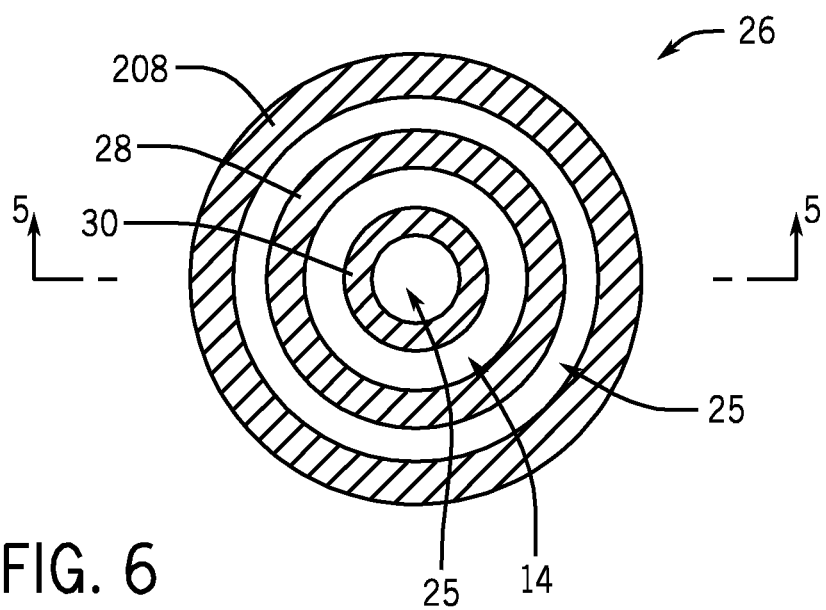
FIG. 6 is a radial cross-section of a fuel injector that may be used with an embodiment of a $CO_2$ treatment system.

To illustrate the structure of the conduits described above from a different perspective, FIG. 6 is a radial cross-section of the fuel injector 26 along the line labeled 6-6 in FIG. 5. Correspondingly, the axial cross-section of FIG. 5 is indicated along the line labeled 5-5 in FIG. 6. Elements in common with those shown in FIG. 5 are labeled with the same reference numerals. In the illustrated embodiment, each of the conduits 30, 28, and 208 appears as an annular ring in the radial cross-section. Thus, the conduits 30, 28, and 208 are coaxial or concentric with one another, thereby providing coaxial flows of the single $CO_2$/oxygen feed 25, fuel 14, and the single $CO_2$/oxygen feed 25. The spacing between each conduit may be configured to adjust the flow rate of the material passing through the conduit. In the illustrated embodiment, there is no separate conduit for the $CO_2$, because substantially all impurities that may be susceptible to reaction or combustion with the oxygen 16 have been removed by the $CO_2$ treatment system 40. Thus, the fuel injector 26 may be simpler, less expensive, and more reliable than other fuel injectors with separate $CO_2$ conduits.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a carbon capture system configured to receive an untreated acid gas from an acid gas recovery unit, wherein the carbon capture system is configured to separate the untreated acid gas into a first acid gas comprising carbon dioxide ($CO_2$) and a second acid gas comprising hydrogen sulfide ($H_2S$);
a $CO_2$ treatment system comprising a catalyst configured to at least one of remove impurities present in the first acid gas to produce a treated $CO_2$, or convert the impurities into oxidized compounds to produce the treated $CO_2$, or any combination thereof; and
a gasifier supply configured to supply the treated $CO_2$ to a gasifier.

2. The system of claim 1, wherein the catalyst comprises a catalytic oxidizer.

3. The system of claim 1, wherein the impurities comprise at least one of hydrogen sulfide, hydrogen, carbon monoxide, or methane, or a combination thereof.

4. The system of claim 1, comprising a mixing chamber configured to combine the treated $CO_2$ and oxygen prior to supply of the treated $CO_2$ to the gasifier.

5. The system of claim 1, comprising a monitoring system configured to monitor a composition of the treated $CO_2$.

6. The system of claim 5, comprising a control system configured to execute a corrective control function if at least one of the impurities in the composition of the treated $CO_2$ is not within a threshold.

7. The system of claim 6, wherein the impurities comprise at least one of hydrogen sulfide, hydrogen, carbon monoxide, or methane, or a combination thereof.

8. The system of claim 6, wherein the control system is configured to execute the corrective control function to reduce a flow of the treated $CO_2$ through the gasifier injector.

9. The system of claim 1, comprising the gasifier configured to gasify a fuel to produce a syngas.

10. The system of claim 1, wherein the gasifier supply comprises a gasifier injector configured to inject the treated $CO_2$, a fuel, and oxygen into the gasifier.

11. The system of claim 10, wherein the gasifier injector comprises a common injection passage configured to flow both the treated $CO_2$ and the oxygen as a single flow.

12. The system of claim 1, comprising the acid gas recovery unit configured to remove acid gases from a syngas to produce a treated syngas and the untreated acid gas comprising the acid gases, wherein the untreated acid gas is separate from the treated syngas.

13. The system of claim 1, wherein a concentration of $CO_2$ in the untreated $CO_2$ is greater than approximately 99 percent.

14. A system, comprising:
an acid gas recovery unit configured to remove acid gases from a syngas to produce a treated syngas stream and an untreated stream comprising the acid gases, wherein the untreated stream is separate from the treated syngas stream;
a carbon capture system configured to separate the untreated stream into a first acid gas stream comprising carbon dioxide ($CO_2$) and a second acid gas stream comprising hydrogen sulfide ($H_2S$);
a $CO_2$ treatment system comprising a catalyst configured to at least one of remove impurities present in the first acid gas stream to produce a treated $CO_2$ stream, or convert the impurities into oxidized compounds to produce the treated $CO_2$ stream, or any combination thereof; and
a gasifier configured to receive the treated $CO_2$ stream, a fuel, and oxygen into a gasification chamber, wherein the gasifier is configured to gasify the fuel to produce the syngas.

15. The system of claim 14, comprising a monitoring system configured to monitor a composition of the treated $CO_2$ stream, and a control system configured to execute a corrective control function if at least one of the impurities in the composition of the treated $CO_2$ stream is not within a threshold.

16. The system of claim 14, comprising an alarm system configured to output an alarm if at least one of the impurities in the composition of the treated $CO_2$ stream is not within a threshold.

17. The system of claim 14, comprising a gasifier injector having a common injection passage configured to flow both the treated $CO_2$ stream and the oxygen as a single flow.

18. A system, comprising:
a monitor configured to monitor a composition of a catalytically treated carbon dioxide ($CO_2$ to be injected into a gasifier, wherein the monitor is configured to monitor a level of impurities in the catalytically treated $CO_2$ after a first $CO_2$ catalytic treatment unit removes impurities present in an untreated $CO_2$ to produce the catalytically treated $CO_2$, or converts the impurities into oxidized compounds to produce the catalytically treated $CO_2$, or any combination thereof, and a concentration of $CO_2$ in the untreated $CO_2$ is greater than approximately 99 percent, wherein the untreated $CO_2$ is received from a carbon capture system configured to separate an untreated acid gas into a first acid gas comprising $CO_2$ and a second acid gas comprising hydrogen sulfide ($H_2S$), and the carbon capture system is configured to receive the untreated acid gas from an acid gas recovery unit; and
a controller configured to execute a corrective control function if at least one of the impurities in the composition of the treated $CO_2$ is not within a threshold.

19. The system of claim 18, comprising a gasifier injector having a common injection passage configured to flow both the catalytically treated $CO_2$ and oxygen as a single flow into the gasifier.

20. The system of claim 18, wherein the controller is configured to actuate a second $CO_2$ catalytic treatment unit if the first $CO_2$ catalytic treatment unit fails to maintain at least one of the impurities in the composition of the catalytically treated $CO_2$ within the threshold.

21. A method, comprising:
gasifying a feedstock to generate a syngas;
removing acid gas from the syngas;
separating the acid gas into a first acid gas comprising carbon dioxide ($CO_2$) and a second acid gas comprising hydrogen sulfide ($H_2S$);
catalytically treating the first acid gas to produce a treated $CO_2$; and
supplying the treated $CO_2$ to a gasifier.

22. A system, comprising:
a gasification controller configured to control one or more operations associated with gasifying a feedstock to generate a syngas, removing acid gas from the syngas, separating the acid gas into a first acid gas comprising carbon dioxide ($CO_2$) and a second acid gas comprising hydrogen sulfide ($H_2S$), catalytically treating the first acid gas to produce a treated $CO_2$, and supplying the treated $CO_2$ to a gasifier.

* * * * *